May 24, 1955

R. E. CARLSON 2,708,991

HYDRAULIC TRANSMISSION

Filed Sept. 20, 1950

Inventor
Rudolph E. Carlson
By
Schroeder, Merriam, Hofgren & Brady
Attorneys

May 24, 1955  R. E. CARLSON  2,708,991
HYDRAULIC TRANSMISSION

Filed Sept. 20, 1950  4 Sheets-Sheet 2

Inventor
Rudolph E. Carlson

May 24, 1955  R. E. CARLSON  2,708,991
HYDRAULIC TRANSMISSION
Filed Sept. 20, 1950  4 Sheets-Sheet 4

Inventor
Rudolph E. Carlson
By Schroeder, Merriam, Hofgren & Brady
Attorneys

United States Patent Office 2,708,991
Patented May 24, 1955

2,708,991

HYDRAULIC TRANSMISSION

Rudolph E. Carlson, Kenilworth, Ill.

Application September 20, 1950, Serial No. 185,751

14 Claims. (Cl. 192—48)

This invention relates to a transmission and more particularly to a hydraulic transmission.

It is the general object of this invention to produce a new and improved hydraulic transmission.

One of he principal features of this invention is the provision of a hydraulic transmission which serves to connect a drive shaft to a driven shaft and which may be used with a series of gear trains to achieve the proper gear ratio between the drive shaft and the driven shaft, and in which the transmission serves not only to lock the drive shaft to the driven shaft through the gear means but provides a smooth hydraulic coupling between the gear means and the drive shaft as the transmission is being shifted from a first gear ratio to a second gear ratio. Thus the transmission of this invention functions, through hydraulic means, gently and gradually to connect the drive shaft to a first gear means, for example low gear, then, as that speed is attained gradually, and still through hydraulic means, to release the connection between low gear and the drive shaft while simultaneously establishing the connection between the drive shaft and second gear, and so on through whatever number of gear trains and gear ratios as may be desired.

Another feature of the invention is the provision of a hydraulic transmission of the type described in the preceding paragraphs which is incapable of getting out of synchronism. Thus, with the hydraulic transmission of this invention, even though the parts become worn through prolonged use it is impossible to have more than one gear train or gear ratio in complete driving connection at one time.

Yet another feature of the invention is to produce a hydraulic transmission in which a driving connection between a drive shaft and a driven shaft is achieved through any one of a plurality of gear trains, and in which the selection of the gear train is achieved through movement of a single valve, which may be of the spool valve type, and thus to provide a transmission which cannot get out of synchronism under any conditions.

Another feature of the invention is the provision of a plurality of hydraulic piston and cylinder devices which are rotated by the drive shaft and are reciprocated through a connecting means which rides on the surface of an eccentric. The gear means for driving the driven shaft are connected to the eccentric together with the provision of a single valve means controlling the discharge openings of the piston and cylinder devices to permit either free reciprocation of the pistons and thus permit the connecting means relative to the eccentric or hydraulically to lock the pistons in the cylinders and thus to lock the eccentric to the drive shaft.

Other and further features and objects of the invention will be apparent from the following description and drawings, in which:

Fig. 1 is a longitudinal vertical section through a hydraulic transmission embodying the invention;

Figs. 2, 3 and 4 are vertical sections along lines 2—2, 3—3 and 4—4 of Fig. 1 respectively;

Fig. 6 is a vertical section along line 6—6 of Fig. 1;

Figure 1:
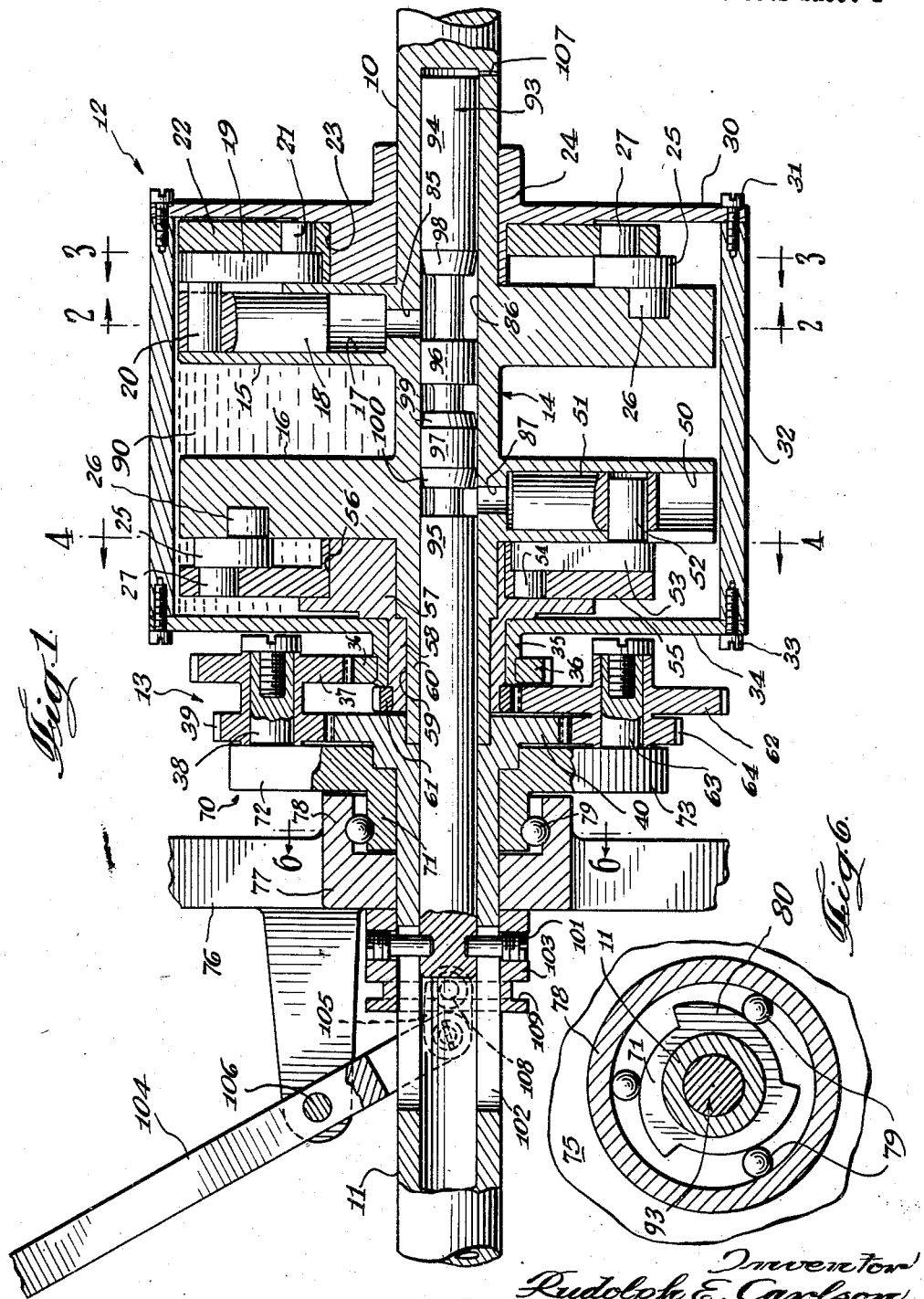

Figs. 7 to 11 inclusive, are views showing the central control valve in various operative positions.

While my invention is susceptible of embodiment in many different forms, I have shown in the drawings and will herein describe in detail one specific embodiment, with the understanding that the present disclosure is to be considered as an exemplification of the principles of the invention and is not intended to limit the invention to the embodiment illustrated. The scope of the invention will be pointed out in the appended claims.

Figure 5:
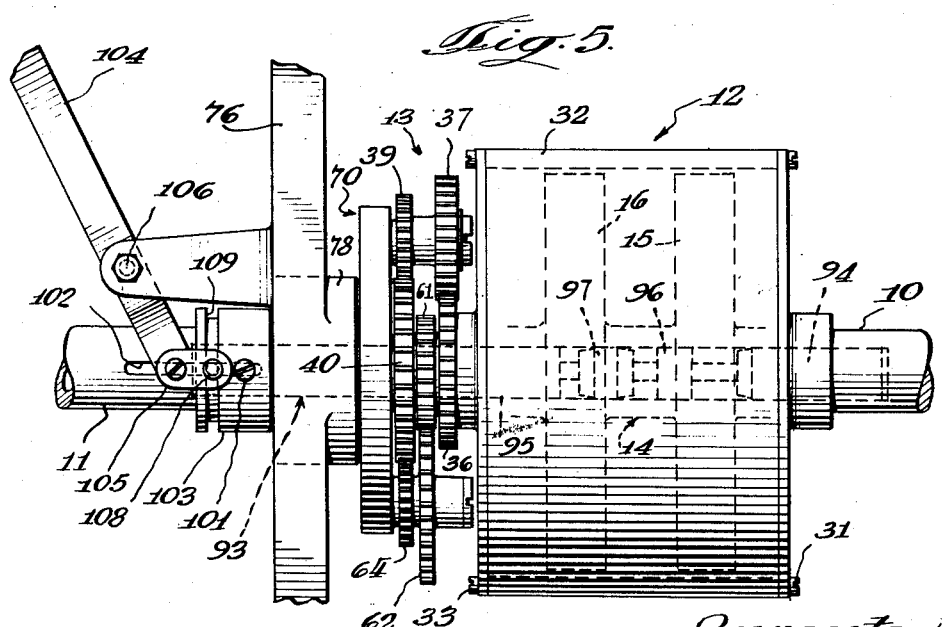
Fig. 5 is an elevational view of the device shown in Fig. 1.
Figure 7:
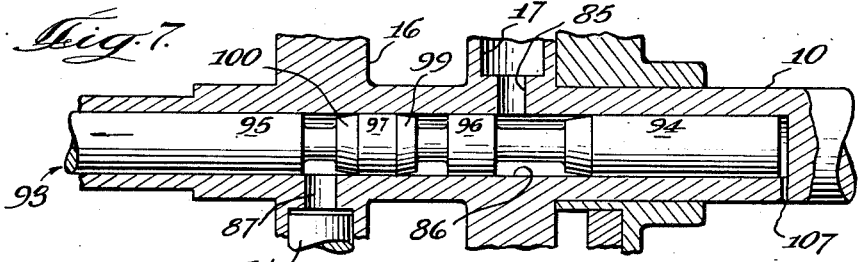
Figure 8:
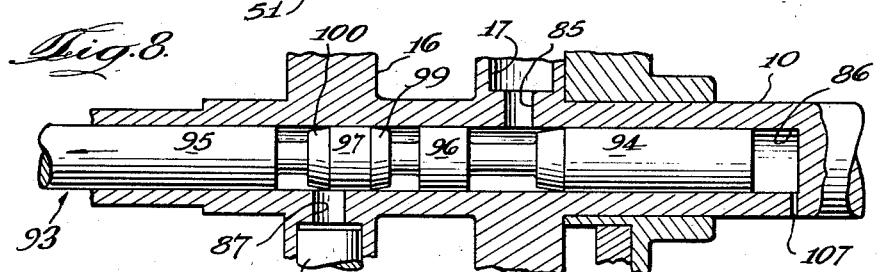

Referring now to Figs. 1 and 5 of the drawings, the transmission of this invention includes a drive shaft 10, a driven shaft 11 and a hydraulic transmission generally designated 12 interposed therebetween. The device includes a rotatably mounted gear train generally designated 13 for providing a number of gear ratios between the drive shaft and the driven shaft. It is contemplated that the transmission and the gear train will be enclosed in a suitable housing (not shown) in order to protect the various parts from exposure to dirt and the elements.

A carrier 14 is fixedly mounted on the drive shaft for rotation thereby. In the particular embodiment of the invention chosen for illustration, the carrier 14 is formed into two parts comprising a first carrier 15 and a second carrier 16, both of which are integral parts of the main carrier 14. As will become obvious from the following descriptions, carriers 15 and 16 may be separate parts, each of which is secured to the drive shaft.

Figure 2:
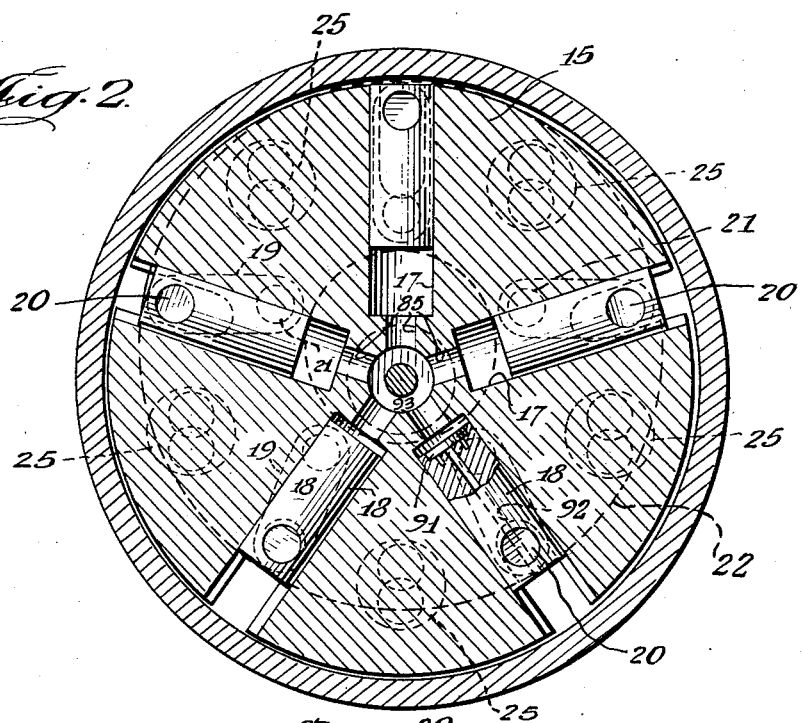
Figure 3:
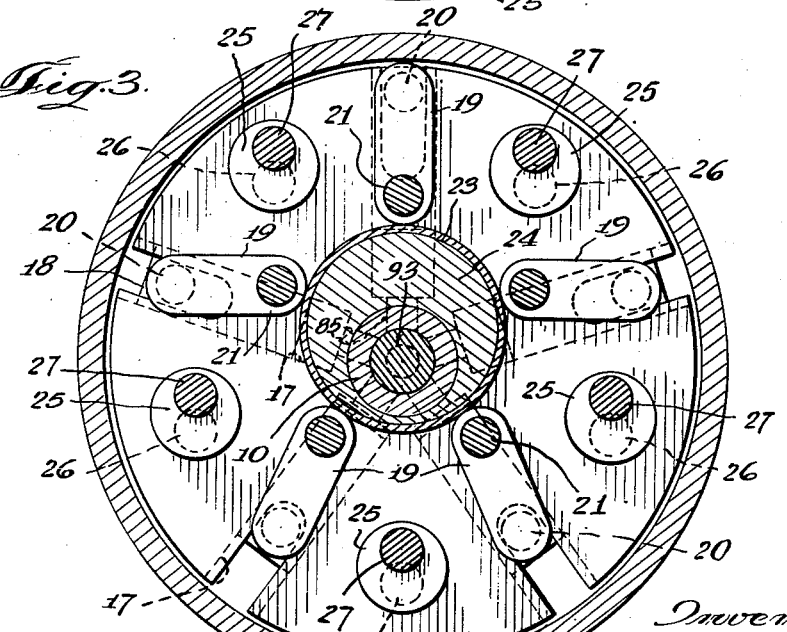
Figure 4:
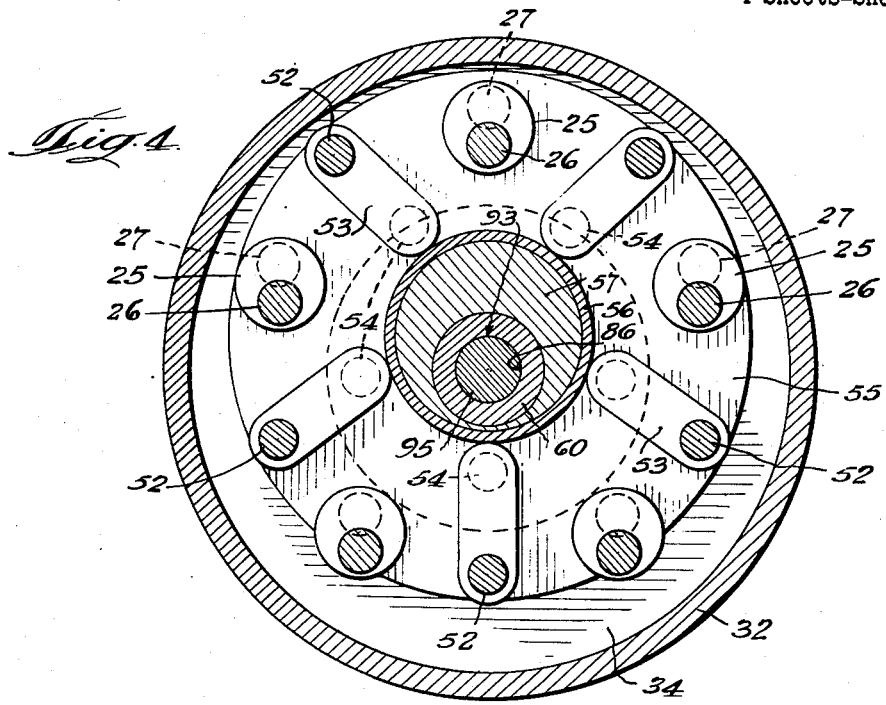

As best seen in Figs. 1 and 2, the carrier 15 is provided with a plurality of cylinders 17 which are radially arranged on the carrier 15 in an annular row. Reciprocably mounted in each of the cylinders 17 is a piston 18, each of which is connected to a separate crank arm 19 as shown. Each of the crank arms 19 has one end pivotally connected to one of the cylinders by the pin 20 and has the other end pivotally connected by means of the pin 21 to an annular ring 22. The ring 22 rides on the surface 23 of a driving element 24, which is secured by means hereinafter to be described to the gear train and thence to the driven shaft 11. As will be noted from an inspection of Figs. 1 and 3, the driving element 24 is so constructed as to locate the surface 23 eccentric to the axis of rotation of the drive shaft 10 and hence of the carrier 15.

The body portion of the carrier 15, that is the portion of the carrier which lies between the cylinders 17, is secured to the ring 22 by means of the eccentric cranks 25, each of which has a pin 26 rotatably mounted in the carrier 15 and a second offset pin 27 rotatably mounted in the ring 22. Thus the annular ring 22 is directly connected to the carrier 15 and rotated therewith although the connection is such as to permit the ring to rotate about an axis which is offset to the axis of rotation of the carrier. Rotation of both the carrier and the ring causes the pistons 18 to reciprocate in the cylinders 17 during one phase of operation of the transmission.

The driving element 24 is secured to one of the gear trains provided in the exemplary embodiment shown in order to rotate the driven shaft 11 as the driving element is rotated.

To this end the driving element 24 is provided with an annular flange 30 secured as with the screw devices 31 to a cylindrical section 32, which in turn is secured by the screw devices 33 to an annular member 34 provided with a flange portion 35 to which is secured a spur gear 36. The gear 36 meshes with a second spur gear 37 rotatably mounted upon a shaft 38, which also carries a spur gear 39 integrally connected to the gear 37. The gear 39 meshes with a drive gear 40 secured to the driven shaft 11.

The carrier 16 is, for the most part, constructed similarly to the carrier 15 and will be described but briefly. Thus the carrier 16 is provided with a number of cylinders 50 in which pistons 51 are reciprocable, with each piston being connected by means of a pin 52 to a crank 53, which in turn is secured by a pin 54 to a second annular ring 55 which rides on the surface 56 of a second driving element 57. Like the first driving element 24, the driving element 57 has its axis of rotation eccentric, or off-center, with respect to the axis of rotation of the carrier 16. The driving element 57 is provided with an integral sleeve portion 58 having an inner bearing surface 59 which rides on an extension 60 of the carrier 14. The outer portion of the sleeve 58 provides a bearing for the flange 35 associated with the first driving element. The sleeve 58 carries a spur gear 61, which meshes with a second spur gear 62 rotatably mounted on a shaft 63 and integrally connected to another spur gear 64, which also meshes with the gear 40 on the driven shaft.

The shafts 38 and 63 are fixed to a gear carrier 70 comprising an annular sleeve 71 rotatably mounted on the driven shaft 11 and carrying arms 72 and 73, which in turn carry the shafts 38 and 63 respectively.

Overrunning brake means 75 (Fig. 6) are provided securing the gear carrier 70 to a frame member 76 of the vehicle or other apparatus with which the transmission is associated in order to permit the gear carrier to rotate in one direction only. To this end, a cup-shaped member 77 is secured to the frame 76 and is provided along the inner edge of the side portions 78 thereof with raceways for receiving ball bearings 79. A ratchet-like member 80 is integrally formed on the outer surfaces of the sleeve 71 and functions in the normal manner of overrunning clutches to permit rotation of the member 80 relative to the side portions 78 in a counterclockwise direction (as seen in Fig. 6) while prohibiting rotation of the member 80, and hence of the carrier 70, in a clockwise direction.

Each of the cylinders 17 is filled with a hydraulic fluid and is provided at its inner end with a discharge opening 85, which opens to an elongated bore 86 formed axially of the drive shaft. In the specific embodiment chosen for illustration, five piston and cylinder devices of equal size are equally spaced around each of the carriers 15 and 16. As the pistons reciprocate with rotation of the drive shaft, fluid discharged from one or more cylinders is discharged through the discharge opening and into the bore 86, from whence it enters one or more cylinders whose pistons are operating on their intake stroke. Thus it is necessary that the volume of hydraulic fluid discharged by any one or more pistons equal at all times the amount of hydraulic fluid taken up by one or more of the other pistons in the carrier on their intake strokes. It has been found that this can be best achieved through the use of five cylinders in each group. If desired, multiples of five cylinders, for example 10, 15, etc., may be used.

In operation of the device, it is contemplated that the space 90 defined by the cylinder portion 32 and the end flanges 30 and 34 be filled with hydraulic fluid, and at least one of the pistons in each group is provided with a flap valve 91 adapted to permit oil in the space 90 to pass through the piston through passage 92 and into the space below the piston in order to make up any hydraulic fluid in the piston and cylinder circuit which may be lost through leakage along the bore 86 or past the pistons in the various cylinders.

Slidably mounted in the bore 86 is a spool valve 93 which is provided with a number of lands for controlling the discharge openings 85 and 87. For this purpose, there are provided two end lands 94 and 95 and two intermediate lands 96 and 97. The lands 94 and 97 are provided with tapered end surfaces 98, 99 and 100 as shown.

The left-hand end (as seen in Fig. 1) of the spool valve 93 is connected to a collar 103 by means of the screw pins 101, which are slidable in a groove 102 formed in the driven shaft and which are mounted in the collar which is slidable on the driven shaft. A shift lever 104 is pivotally connected to the collar 103 by means of the link 105 and pin 108 which rides in an annular groove 109 in the collar. Thus movement of the handle about its pivot point 106 serves to slide the valve 93 in the bore 86. A passage 107 connects the right-hand end of the bore 86 with the exterior of the drive shaft in order to permit drainage of any oil which may leak past the land 94 and into the right-hand end of the bore. Thus free movement of the spool valve 93 is possible at all times.

Referring now to Figs. 1 and 7 to 11, inclusive, the operation of the device will be described. With the spool valve 93 in the position shown in Figs. 1 and 7, the transmission is in neutral. As the drive shaft 10 is rotated, the carrier 14 is rotated and the annular rings 22 and 55 are carried around the eccentric surfaces of the driving elements 24 and 57. This produces a reciprocation of the pistons in their respective cylinders, but oil is merely transferred from one piston to another through the discharge openings into the bore 86. In order to transmit motion to the driven shaft, the shift lever 104 is rotated clockwise about the pivot 106 to shift the spool valve into the position shown in Fig. 8. In this position, it will be noted that the discharge passages 85 are still open for free communication between all the cylinders in the carrier 15. The discharge openings 87 are partially closed although some fluid flow is permitted because of the tapered portion 100. The flow, however, between cylinders in the carrier 16 is restricted, and thus movement of the annular ring 55 about the eccentric surface 56 is also restricted. Inasmuch as the pistons 51 are reciprocated only under pressure the force necessary to reciprocate the pistons is transmitted to the driving element 57 through the cranks 53 and the ring 55, and thus the driving element 57 is urged toward rotation.

Rotation of the driving element 57 rotates the gear 61 and hence the gears 62, 64 and the gear 40 fixed to the driven shaft. The thrust imparted to the driven shaft is still, however, a cushioned thrust inasmuch as it is taking place by virtue of the hydraulic piston and cylinders in the carrier 16. With the shift lever 104 shifted to the position shown in Fig. 9, a positive drive is achieved inasmuch as the land 97 has completely blocked the passages 87, and hence the pistons 51 are locked against reciprocation. In this position, the ring 55 cannot oscillate about the eccentric surface of the driving element 57, and the carrier, ring, and driving element are locked together to produce a positive drive.

The gear train just described, including the gears 61, 62, 64 and 40, is so proportioned as to produce a first or low speed, that is a ratio of less than 1:1, between the drive shaft and the driven shaft.

Figure 10:
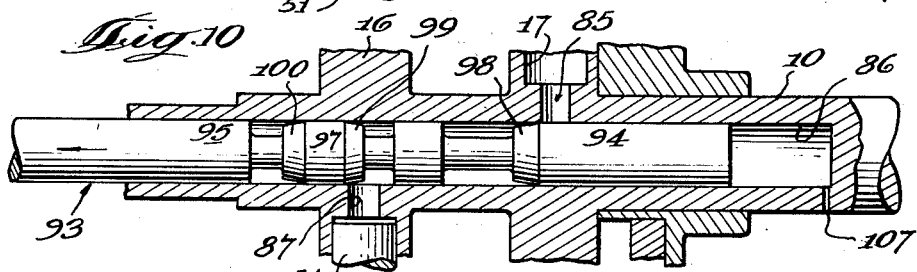

Further clockwise movement of the shift lever 104 serves to move the spool valve into the position shown in Fig. 10. In this position, it will be noted that the passages 87 are open, which allows the pistons 51 in the carrier 16 to reciprocate. The land 94, however, has closed off the openings 85, serving to lock the pistons 18 in their respective cylinders in the carrier 15. With the pistons 18 so locked, the annular ring 22 cannot oscillate about the eccentric surface 23, and hence the carrier 15, the ring 22, and the driving element 24 rotate as a unit. Rotation of the driving element 24 serves, through the gears 36, 37, 39 and 40 to rotate the driven shaft. The gear train just described may be so proportioned as to produce an intermediate or second gear ratio, preferably still less than 1:1, between the drive shaft and the driven shaft.

Figure 9:
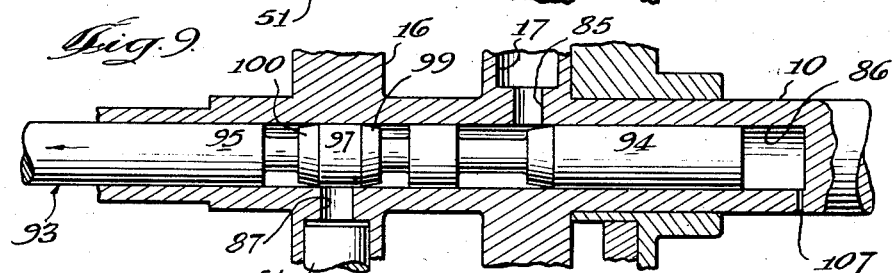

As the spool valve is shifted between the position shown in Fig. 9 and that shown in Fig. 10, the transition between low and second is again cushioned because of the fact that an intermediate position is reached wherein the flow through the discharge openings 85 is progressively restricted because of the tapered end 98 of the land 94. Similarly, the flow between the passages 87 is progressively and gradually reestablished because of the tapered end 99 of the land 97.

Figure 11:
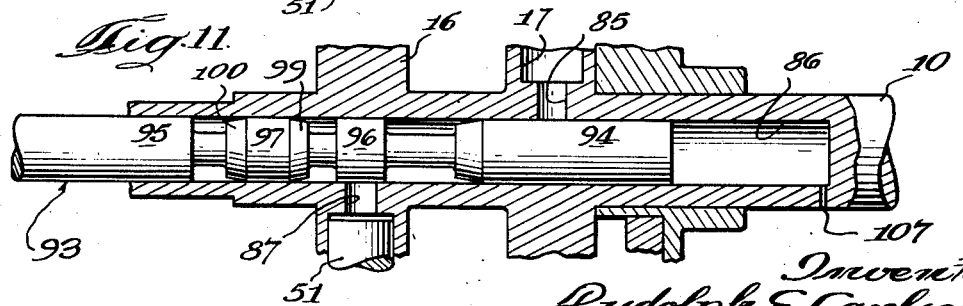

Further pivotal movement of the shift lever 104 serves to shift the spool valve to the position shown in Fig. 11. In this position, the openings 85 are completely blocked by the land 94, and the discharge openings 87 are completely blocked by the land 96. Thus both sets of pistons are locked against reciprocation, and both carriers 15 and 16 are locked to the driving elements 24 and 57 respectively. When this occurs because of the difference in the ratios of the first and second gear train, the gears are locked against rotation, and thus the gear 40 on the driven shaft rotates at the same speed as the drive shaft. Thus a 1:1 drive or high gear is achieved. Again it should be noted that the transition from second to third, that is the transition in moving from the valve position of Fig. 10 to that of Fig. 11, is cushioned by virtue of the fact that the openings 87 are gradually closed off by movement of the land 96 across the inner end of the openings.

In the operation of the spool valve just described, it will be noted that the pressures on the valve itself are balanced pressures, and thus very little resistance to movement of the valve is encountered. This feature renders the transmission particularly adaptable to automatic operation. Inasmuch as but little force is required to shift the valve through its various operating positions, a simple form of automatic governor control or torque responsive mechanism may be incorporated to take the place of the shift lever 104.

Another feature which is apparent from the foregoing description is that the transmission cannot get out of synchronism, and it is impossible to arrive at a condition wherein both first and second speeds are in positive drive at the same time, a condition which is apt to arise in other forms of hydraulic transmissions. Obviously, the spool valve cannot be in the position of Fig. 8 and Fig. 10 at the same time. Furthermore, the transmission cannot fail to function even though the various parts may become worn. If some leakage occurs along the bore and past the lands, the various pistons may be able to reciprocate at an extremely low rate which will result only in a slight amount of slippage, that is, such leakage will result in a slight stepping down of all of the gear ratios described.

Should the transmission of this invention be incorporated in a vehicle, such as an automobile, it would, of course, be preferable to provide some means of locking the overrunning brake mechanism 75 so that the braking power of the engine may be used to hold the vehicle when going down grades. Thus with the provision of a locking mechanism and with the spool valve shifted to the position of Fig. 10 (second speed), the compression of the engine is transmitted to the wheels to hold the car without the use of brakes.

In the foregoing description no reverse gear has been shown. For automotive installations a reversing gear must be installed, and conventional gears of this type may be provided on the driven shaft 11 at any position beyond the transmission.

I claim:

1. A hydraulic transmission for coupling a drive member to a selected one of a plurality of driven members comprising a first and a second carrier mounted for rotation by the drive member, a hydraulic piston and cylinder device mounted on each carrier with each of said devices having a discharge opening, a first driving element connected to one of the driven members and having a surface eccentric to the axis of rotation of the first carrier, means riding on said surface for reciprocating the piston on the first carrier, a second driving element connected to another of the driven members and having a surface eccentric to the axis of rotation of the second carrier, means riding on the last mentioned surface for reciprocating to the piston on the second carrier, valve means for closing said discharge openings and means for moving said valve means for progressively closing one of the discharge openings to lock the first driving element to the first carrier, then for progressively opening the last mentioned discharge opening and closing the other discharge opening to lock the second driving element to the second carrier and then for progressively closing said other discharge opening to lock both driving elements to their respective carriers.

2. In an apparatus having a drive member and a plurality of driven members, a hydraulic transmission operatively interposed between said drive member and the driven members and adapted to connect the drive member selectively to the driven members comprising a carrier mounted for rotation by the drive member, a first plurality of hydraulic piston and cylinder devices mounted on the carrier with each of said devices having a discharge opening connected to a common fluid passage, a first driving element having a surface eccentric to the axis of rotation of the carrier and adapted to be connected to one of the driven members, a first member having a surface surrounding and slidably engaging the eccentric, a plurality of cranks with each crank having one end pivotally secured to the first member and having the other end pivotally secured to a different one of the pistons, a second plurality of hydraulic piston and cylinder devices mounted on the carrier with each of said last mentioned devices having a discharge opening connected to a second common fluid passage, a second driving element having a surface eccentric to the axis of rotation of the carrier and adapted to be connected to another of the driven members, a second member having a surface surrounding and slidably engaging the eccentric, a plurality of cranks with each crank having one end pivotally secured to the second member and having the other end pivotally secured to a different one of the second plurality of pistons, valve means for closing said common passages and means for moving said valve means for progressively closing the first passage to lock the first driving element to the carrier and then for progressively opening said first passage and closing said second passage to lock the second driving element to the carrier.

3. In an apparatus having a drive member and a plurality of driven members, a hydraulic transmission operatively interposed between said drive member and the driven members and adapted to connect the drive member selectively to the driven members comprising a carrier mounted for rotation by the drive member, a group of five hydraulic piston and cylinder devices of equal size mounted on the carrier with each of said devices having a discharge opening connected to a common fluid passage with said cylinders, openings and the common fluid passage forming a closed hydraulic circuit, a first driving element having a surface eccentric to the axis of rotation of the carrier and adapted to be connected to one of the driven members, an annular ring surrounding and slidably engaging the eccentric, a plurality of cranks with each crank having one end pivotally secured to the ring and having the other end pivotally secured to a different one of the pistons, a second group of five hydraulic piston and cylinder devices mounted on the carrier with each of said last-mentioned devices having a discharge opening connected to a second common fluid passage with said second devices, openings and second common fluid passage forming another closed hydraulic circuit, a second driving element having a surface eccentric to the axis of rotation of the carrier and adapted to be connected to another of the driven members, an annular ring surrounding and slidably engaging the last named eccentric, a plurality of cranks with each crank having one end pivotally secured to the last named ring and having the other end pivotally secured to a different one of the second group of pistons, valve means for closing said common passages and means for moving said valve means for progressively closing the first passage to lock the first driving element to the carrier and then for progressively opening said first passage and closing said second passage to lock the second driving element to the carrier.

4. In an apparatus having a drive member and a plurality of driven members, a hydraulic transmission operatively interposed between said drive member and the driven members and adapted to connect the drive member selectively to the driven members comprising a first and a second annular carrier mounted for rotation by the drive shaft, a plurality of hydraulic piston and cylinder devices of equal size radially arranged in an annular row on the first carrier with each of said devices having a discharge opening at its inner end connected to a common fluid passage with said cylinders, openings and the common fluid passage forming a closed hydraulic circuit, a first driving element having a surface eccentric to the axis of rotation of the first carrier and adapted to be connected to the first driven member, an annular ring surrounding and slidably engaging the eccentric, a plurality of cranks with each crank having one end pivotally secured to the ring and having the other end pivotally secured to a different one of the pistons, a second plurality of hydraulic piston and cylinder devices radially arranged in an annular row on the second carrier with each of said last mentioned devices having a discharge opening at its inner end connected to a second common fluid passage with said second devices, openings and second common fluid passage forming another closed hydraulic circuit, a second driving element having a surface eccentric to the axis of rotation of the second carrier and adapted to be connected to the second driven member, an annular ring surrounding and slidably engaging the eccentric, a plurality of cranks with each crank having one end pivotally secured to the last named ring and having the other end pivotally secured to a different one of the last mentioned pistons, valve means for controlling said common passages, said valve means including a first portion controlling the first common passage and a second portion connected to and movable with the first portion and controlling the second common passage, and means for moving said valve means for progressively bringing said first portion into position closing the first common passage to lock the first driving element to the first plurality of piston and cylinder devices for rotation therewith and then for progressively opening said first common passage and moving the second portion to a position closing the second common passage to lock the second driving element to the second plurality of piston and cylinder devices for rotation therewith.

5. In an apparatus having a drive member and a plurality of driven members, a hydraulic transmission operatively interposed between said drive member and the driven members and adapted to connect the drive member selectively to the driven members comprising a first plurality of hydraulic piston and cylinder devices mounted in an annular row for rotation with the drive member with each of said devices having a discharge opening and with all of said discharge openings being interconnected to form with the cylinders associated therewith a closed hydraulic circuit, a first driving element having a surface eccentric to the axis of rotation of the piston and cylinder devices and adapted to be connected to one of the driven members, means riding on said surface and connected to each of said pistons for reciprocating the same, a second plurality of hydraulic piston and cylinder devices mounted in an annular row for rotation with the drive member with each of said last mentioned devices having a discharge opening and with all of the last mentioned discharge openings being interconnected to form with the cylinders associated therewith another closed hydraulic circuit and with both pluralities of hydraulic piston and cylinder devices being rotatable about a common axis, a second driving element having a surface eccentric to the axis of rotation of the second plurality of hydraulic piston and cylinder devices and adapted to be connected to another of the driven members, means riding on said last mentioned surface and connected to each of the pistons in the second plurality of devices for reciprocating the same, and valve means for closing said discharge openings, said valve means including a bore lying in said axis of rotation of said devices and connected to each of said openings, a spool valve slidably mounted in the bore and having a first land controlling the discharge openings of the first plurality of cylinders and a second land spaced from the first land and controlling the openings of the second plurality of cylinders, and means for moving said spool valve to progressively close the discharge openings of the first plurality of cylinders to lock the first driving element to said first plurality of piston and cylinder devices, and then progressively opening the last mentioned discharge openings while simultaneously closing the other discharge openings to lock the second driving element to the second plurality of piston and cylinder devices.

6. Apparatus of the character described in claim 5 in which said lands are provided with tapered ends gradually to close said openings with movement of the spool valve.

7. In an apparatus having a drive member and a plurality of driven members, a hydraulic transmission operatively interposed between said drive member and the driven members and adapted to connect the drive member selectively to the driven members comprising a carrier mounted for rotation by the drive member, a first plurality of hydraulic piston and cylinder devices mounted on the carrier with each of said devices having a discharge opening at its inner end and connected to a common fluid passage, a first driving element having a surface eccentric to the axis of rotation of the carrier and adapted to be connected to one of the driven members, an annular ring surrounding and slidably engaging the eccentric, a plurality of cranks with each crank having one end pivotally secured to the ring and provided at its other end with a pin extending through a slot in the side walls of the cylinders and pivotally connected to the piston therein, a second plurality of hydraulic piston and cylinder devices mounted on the carrier with each of said last mentioned devices having a discharge opening at its inner end and connected to a second common fluid passage, a second driving element having a surface eccentric to the axis of rotation of the carrier and adapted to be connected to another of the driven members, an annular ring surrounding and slidably engaging the last named eccentric, a plurality of cranks with each crank having one end pivotally secured to the last named ring and provided at its other end with a pin extending through a slot in the side walls in the outer ends of each of the cylinders in the last named plurality of piston and cylinder devices and pivotally connected to the pistons therein, valve means for closing said common passages and means for moving said valve means for progressively closing the first passage to lock the first driving element to the carrier and then for progressively opening said first passage and closing said second passage to lock the second driving element to the carrier.

8. In an apparatus having a drive member and a plurality of driven members, a hydraulic transmission operatively interposed between said drive member and the driven members and adapted to connect the drive member selectively to the driven members comprising a carrier mounted for rotation by the drive member, a first plurality of hydraulic piston and cylinder devices mounted on the carrier with each of said devices having a discharge opening at its inner end and connected to a common fluid passage with said cylinders, openings and the common fluid passage forming a closed hydraulic circuit, a first driving element having a surface eccentric to the axis of rotation of the carrier and adapted to be connected to one of the driven members, an annular ring surrounding and slidably engaging the eccentric, a plurality of cranks with each crank having one end pivotally secured to the ring and provided at its other end with a pin extending through a slot in the side walls of the cylinders and pivotally connected to the piston therein, another plurality of cranks each having one end pivotally secured to said ring and having the other end pivotally secured to the carrier, a second plurality of hydraulic piston and cylinder devices mounted on the carrier with each of said last mentioned devices having a discharge opening at its inner end and connected to a second common fluid passage with said second devices, openings and second common fluid passage forming another closed hydraulic circuit, a second driving element having a surface eccentric to the axis of rotation of the carrier and adapted to be connected to another of the driven members, an annular ring surrounding and slidably engaging the last named eccentric, a plurality of cranks with each crank having one end pivotally secured to the last named ring and provided at its other end with a pin extending through a slot in the side walls in the outer ends of each of the cylinders in the last named plurality of piston and cylinder devices and pivotally connected to the pistons therein, another plurality of cranks each having one end pivotally secured to the last named ring and having the other end pivotally secured to the last named carrier, valve means for closing said common passages and means for moving said valve means for progressively closing the first passage to lock the first driving element to the carrier and then for progressively opening said first passage and closing said second passage to lock the second driving element to the carrier.

9. In an apparatus having a drive member and a plurality of driven members, a hydraulic transmission operatively interposed between said drive member and the driven members and adapted to connect the drive member selectively to the driven members comprising a carrier mounted for rotation by the drive member, a first plurality of hydraulic piston and cylinder devices mounted on the carrier with each of said devices having a discharge opening at its inner end and connected to a common fluid passage, a first driving element having a surface eccentric to the axis of rotation of the carrier and adapted to be connected to one of the driven members, an annular ring surrounding and slidably engaging the eccentric, a plurality of cranks with each crank having one end pivotally secured to the ring and provided at its other end with a pin extending through a slot in the side walls of the cylinders and pivotally connected to the piston therein, another plurality of cranks each having one end pivotally secured to said ring and having the other end pivotally secured to the carrier at points equally spaced around the carrier and intermediate said cylinders, a second plurality of hydraulic piston and cylinder devices mounted on the carrier with each of said last mentioned devices having a discharge opening at its inner end and connected to a second common fluid passage, a second driving element having a surface eccentric to the axis of rotation of the carrier and adapted to be connected to another of the driven members, an annular ring surrounding and slidably engaging the last named eccentric, a plurality of cranks with each crank having one end pivotally secured to the last named ring and provided at its other end with a pin extending through a slot in the side walls in the outer ends of each of the cylinders in the last named plurality of piston and cylinder devices and pivotally connected to the pistons therein, another plurality of cranks each having one end pivotally secured to the last named ring and having the other end pivotally secured to the last named carrier at points equally spaced around the carrier and intermediate the second plurality of cylinders, valve means for closing said common passages and means for moving said valve means for progressively closing the first passage to lock the first driving element to the carrier and then for progressively opening said first passage and closing said second passage to lock the second driving element to the carrier.

10. In an apparatus having a drive member and a driven member, a hydraulic power transmitting means operatively interposed between said members comprising a rotatably mounted carrier connected to one of said members, a plurality of hydraulic piston and cylinder devices radially arranged on the carrier with each of said devices having a discharge opening, a driving element connected to the other of said members and mounted for rotation about the axis of rotation of the carrier, said driving member having an annular exterior surface eccentric to said axis, an annular ring surrounding and slidably engaging said eccentric surface, crank means for each piston pivotally connected to said ring, and valve means controlling said discharge openings.

11. In an apparatus having a drive member and a driven member, a hydraulic power transmitting means operatively interposed between said members comprising a rotatably mounted carrier connected to one of said members, a plurality of hydraulic piston and cylinder devices radially arranged on the carrier with each of said devices having a discharge opening at its inner end connected to a common passage to form a closed hydraulic circuit, a driving element connected to the other of said members and mounted for rotation about the axis of rotation of the carrier, said driving member having an annular exterior surface eccentric to said axis, an annular ring surrounding and slidably engaging said eccentric surface, crank means for each piston pivotally connected to said ring, and a spool valve slidably mounted in said passage and provided with a land controlling said discharge openings.

12. Apparatus of the character described in claim 11 in which said land is provided with a tapered end gradually to close said discharge openings with sliding movement of the spool valve.

13. In an apparatus having a drive member and a driven member, a hydraulic power transmitting means operatively interposed between said members comprising a rotatably mounted carrier connected to one of said members, a plurality of hydraulic piston and cylinder devices radially arranged on the carrier with each of said devices having a discharge opening at its inner end connected to a common passage to form a closed hydraulic circuit, a driving element connected to the other of said members and mounted for rotation about the axis of rotation of the carrier, said driving member having an annular exterior surface eccentric to said axis, an annular ring surrounding and slidably engaging said eccentric surface, a plurality of cranks, one for each piston, with each crank being pivotally connected at one end to its associated piston and pivotally connected at its other end to the ring, another plurality of cranks with each crank having one end pivotally secured to the ring and having the other end pivotally secured to the carrier at points spaced around the carrier and intermediate the cylinder, and a spool valve slidably mounted in said passage and provided with a land controlling said discharge openings.

14. In apparatus having a drive member and a plurality of driven members, a hydraulic transmission operatively interposed between said drive member and the driven members and adapted to connect the drive member selectively to the driven members comprising a carrier mounted for rotation by the drive member, a plurality of hydraulic piston and cylinder devices mounted on the carrier with each of said devices having a discharge opening, a first driving element having a surface eccentric to the axis of rotation of the carrier, means riding on said surface and adapted to be connected to one of the driven members, said means being connected to one of the pistons for reciprocating the same, a second driving element having a surface eccentric to the axis of rotation of the carrier, means riding on said last mentioned surface and adapted to be connected to another of the driven members, said last named means being connected to another of the pistons for reciprocating the same, and valve means for closing said discharge openings, said valve means including a bore connected to each of said openings, a spool valve slidably mounted in the bore and having a land controlling each of said openings and means for moving said spool valve to progressively close one of the discharge openings to lock the first driving element to the carrier, then progressively opening the last mentioned discharge opening and closing the other discharge opening to lock the second driving element to the carrier and then for progressively closing said last mentioned discharge opening to lock both driving elements to the carrier.

References Cited in the file of this patent

UNITED STATES PATENTS

| | | |
|---|---|---|
| 661,001 | Ryther | Oct. 30, 1900 |
| 672,779 | Jones | Apr. 23, 1901 |
| 1,990,067 | Finken | Feb. 5, 1935 |
| 2,022,663 | Grey et al. | Dec. 3, 1935 |
| 2,048,206 | Tyler | July 21, 1936 |

FOREIGN PATENTS

| | | |
|---|---|---|
| 9,489 | Great Britain | Mar. 4, 1909 |
| 487,791 | Germany | Nov. 28, 1929 |